United States Patent
Hofmann et al.

(10) Patent No.: US 9,091,865 B2
(45) Date of Patent: Jul. 28, 2015

(54) FRACTAL FEATURES FOR ENHANCED TEAR EXCHANGE

(75) Inventors: Gregory J. Hofmann, Jacksonville Beach, FL (US); Philippe F. Jubin, Fernandina Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 13/352,898

(22) Filed: Jan. 18, 2012

(65) Prior Publication Data
US 2013/0182214 A1 Jul. 18, 2013

(51) Int. Cl.
*G02C 7/00* (2006.01)
*G02C 7/02* (2006.01)
*G02C 7/04* (2006.01)

(52) U.S. Cl.
CPC ............ *G02C 7/047* (2013.01); *G02C 7/048* (2013.01)

(58) Field of Classification Search
CPC ............................ G02C 7/048; G02C 7/047
USPC ............ 351/159, 159.04, 162, 177, 159.02, 351/159.38, 159.36, 159.73
See application file for complete search history.

(56) References Cited

U.S. PATENT DOCUMENTS

| | | | |
|---|---|---|---|
| 2,196,066 A | 4/1940 | Feinbloom | |
| 4,889,421 A | 12/1989 | Cohen et al. | |
| 5,044,742 A | 9/1991 | Cohen | |
| 5,500,695 A | 3/1996 | Newman | |
| 2003/0035083 A1* | 2/2003 | Francis et al. | 351/162 |
| 2005/0146679 A1 | 7/2005 | Marmo et al. | |
| 2007/0013869 A1* | 1/2007 | Dahi et al. | 351/219 |
| 2007/0222944 A1* | 9/2007 | Hofmann et al. | 351/177 |
| 2012/0242951 A1* | 9/2012 | Roffman et al. | 351/159.19 |

FOREIGN PATENT DOCUMENTS

| | | |
|---|---|---|
| EP | 0369561 A2 | 5/1990 |
| EP | 2116886 A1 | 11/2009 |
| TW | 289693 B | 11/2007 |
| WO | WO 89/07281 A1 | 8/1989 |
| WO | WO 90/08339 A1 | 7/1990 |
| WO | WO 92/22845 A1 | 12/1992 |
| WO | WO 97/24639 A1 | 7/1997 |
| WO | WO 02/10841 A1 | 2/2002 |
| WO | WO 02/27388 A1 | 4/2002 |
| WO | WO 2012/129052 A1 | 9/2012 |

OTHER PUBLICATIONS

European Search Report dated Mar. 26, 2013 for corresponding Application No. EP 13151574.
Singapore Search Report dated Jun. 20, 2013 for corresponding Patent Application No. SG201300054-2.
Official Action issued by the Russian Patent Office for corresponding Application No. 2013102276/28(003027).

\* cited by examiner

*Primary Examiner* — Ricky Mack
*Assistant Examiner* — Mustak Choudhury
(74) *Attorney, Agent, or Firm* — Carl J. Evens (57) ABSTRACT

Feature patterns may be incorporated into the peripheral region of the back curve surface of contact lenses in order to increase tear exchange between the contact lens and the cornea. The feature patterns may be based upon fractal geometry and be incorporated anywhere in the periphery of the lens. The placement feature patterns are preferably determined utilizing a combination of simulations and experimentation.

6 Claims, 3 Drawing Sheets

FRACTAL FEATURES FOR ENHANCED TEAR EXCHANGE

BACKGROUND OF THE INVENTION

1. Field of the Invention

The present invention relates to contact lenses having improved tear exchange, and more particularly to contact lenses having fractal features formed in the periphery of the back curve side thereof to improve tear exchange.

2. Discussion of the Related Art

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials, were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials. However, these new contact lenses are not totally without limitations.

Contact lenses may be worn by many users for eight (8) hours to several days in a row without any adverse reactions such as redness, soreness, mucin buildup and symptoms of contact lens related dry eye. However, some users begin to develop these symptoms after only a few hours of use. Many of those contact lens wearers use rewetting solutions to alleviate the discomfort associated with these adverse reactions with some success. However, the use of these solutions requires that users carry extra solutions and this may prove to be inconvenient. For these users a more comfortable contact lens that does not require the use of rewetting solutions would be useful.

Potential problems associated with contact lens wear may affect the eyelid, the conjunctiva, the various layers of the cornea and the tear film that covers the outer surface of the eye.

When a contact lens is positioned on the eye, layers of tear film form both between the back curve or posterior surface of the contact lens and the cornea as well as over the anterior surface of the contact lens. It is beneficial to refresh tears or the tear film in both regions in order to remove contaminants that build up in the tear film, and it is particularly beneficial to refresh the tear film behind the contact lens or more precisely the tear film between the posterior surface of the contact lens and the cornea. Accordingly, there exists a need for an improved contact lens that facilitates tear exchange posterior to the contact lens.

SUMMARY OF THE INVENTION

The fractal features formed in the periphery of the back curve side or surface of contact lenses of the present invention overcomes the limitations associated with the prior art as briefly described above.

In accordance with a first aspect, the present invention is directed to an ophthalmic device. The device comprising a contact lens having a back curve surface, a front curve surface, an optic zone and a peripheral zone, and at least one feature pattern incorporated into the back curve surface in the peripheral zone of the contact lens, the at least one feature pattern being based upon fractal geometry.

In accordance with another aspect, the present invention is directed to an ophthalmic device. The device comprising a contact lens having a back curve surface, a front curve surface, an optic zone and a peripheral zone, and at least one feature pattern incorporated into the back curve surface in the peripheral zone of the contact lens, the at least one feature pattern being based upon an iterated function system with a random component.

In accordance with yet another aspect, the present invention is directed to a method for making an ophthalmic device. The method comprising forming a contact lens having a back curve surface, a front curve surface, an optic zone and a peripheral zone, generating at least one feature pattern, and incorporating the at least one feature pattern into the back curve surface in the peripheral zone of the contact lens, the at least one feature pattern being based upon fractal geometry When a contact lens is placed on the eye, layers of tear film form between the posterior surface of the contact lens and the cornea and over the anterior surface of the contact lens. Proper distribution of this tear film is important to achieving a comfortable lens fit and vision improvement. The present invention is directed to a contact lens design which focuses on improving the tear exchange or tear refreshment that occurs between the posterior surface of the contact lens and the cornea because it is believed that poor tear exchange in the eye of a wearer of contact lenses may contribute to adverse events. For example, a thinner posterior tear film may translate into higher shear forces to the ocular surface thereby resulting in greater stress to the epithelial layer of the cornea. In addition, poor or reduced tear exchange may result in the buildup of contaminants in the eye.

Given the likely relationship between low or insufficient tear exchange and adverse ocular response, it is possible that the timely removal of contaminants and the restoration of a thick tear film posterior of the contact lens will preferably result in significantly lower adverse ocular events. Accordingly, the present invention is directed to feature patterns formed in the peripheral region of the back curve surface of contact lenses in order to increase tear film thickness and thus increase tear exchange. The feature pattern may comprise any suitable design, but preferably comprises a pattern based upon fractal geometry.

The fractal patterns are relatively simple to generate and easy to incorporate into the peripheral zone of the back curve surface of contact lenses. The fractal patterns may be incorporated into existing contact lens manufacturing process thereby ensuring minimal increases in manufacturing costs. As the fractal patterns are incorporated into the peripheral zone of the contact lens, they will not interfere with the wearer's vision.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Figure 1:
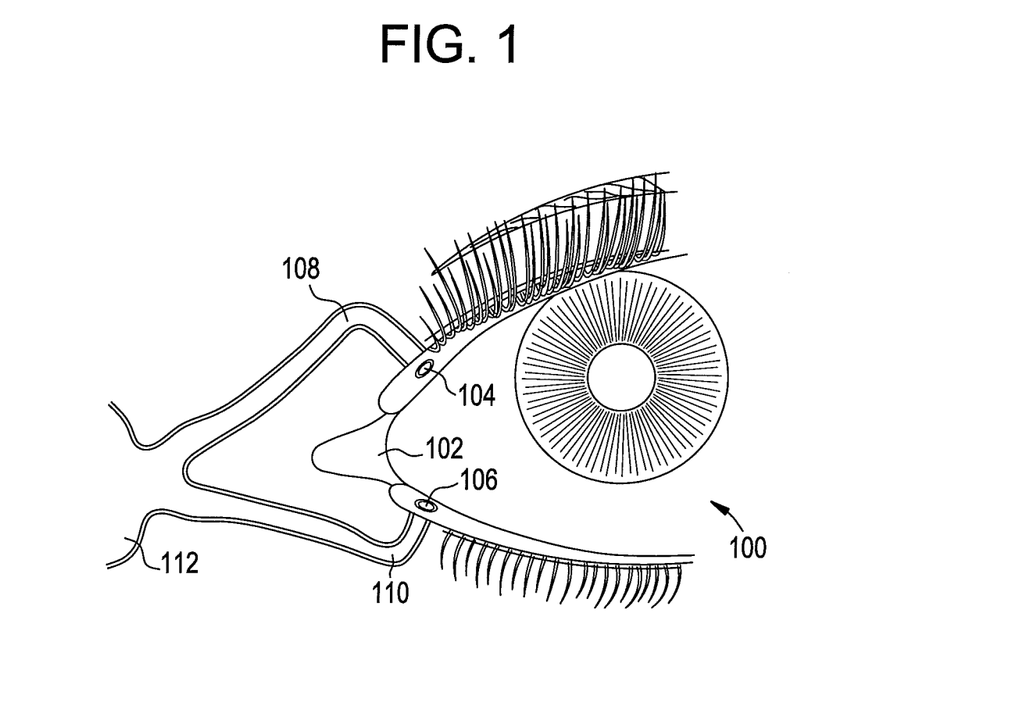
FIG. 1 illustrates the anatomy of the lacrimal drainage system of the human eye.

FIG. 1 illustrates the anatomy of the drainage system of a human eye 100. Tears are produced by the lacrimal gland, not illustrated, superior to the outer portion of each eye 100. Tears flow across the surface of the eye 100 to a shallow pool, termed the lacrimal lake 102, located where the upper and lower eyelids come together at their inner ends or nasal ends. From there, the tears drain through small openings in each of the eyelids, namely, the upper lacrimal punctum 104 and the lower lacrimal punctum 106. From the upper lacrimal punctum 104 and the lower lacrimal punctum 106, the tears pass into the upper lacrimal canaliculus 108 and lower lacrimal canaliculus 110, respectively, which are duct-like pathways leading to the lacrimal sac 112. The lacrimal sac 112 is the superior, expanded portion of the nasolacrimal duct, not illustrated, which drains tears into the nasal system. The upper lacrimal punctum 104 and associated canaliculus 108 typically only drain about ten percent of the tears from the eye 100, such that their obstruction virtually never leads to the tear overflow.

Tears or the tear film comprises three layers. The first layer or bottom layer is the layer that coats the eye and comprises mucin which is created by cells in the conjunctiva referred to as goblet cells. The mucin fills in microscopic irregularities on or in the eye's surface which is important to clear vision. The second layer or middle layer of the tear film comprises essentially water and makes up the bulk of the tear film. A majority of the watery component is produced or supplied from the main lacrimal or tear gland. Emotional tears and reflect tears, i.e. tears resulting from a stimulus such as bright light or a foreign body, come from the main lacrimal gland. Accessory lacrimal glands, known as the glands of Wolfing and Kraus are found in the eyelid tissue and also contribute to the watery component. The third or top layer of the tear film comprises a thin layer of oil secreted by the meibomian glands and functions to prevent the tears from evaporating too quickly.

In the human eye, the tear film is distributed over the cornea to create a smooth surface. Since the largest refractive index difference in the eye occurs at the air-to-tear film interface, this surface contributes a majority of the eye's optical power. In addition to its optical properties, the tear film serves to lubricate the eye, and in general keep it in a healthy state.

When a person blinks, a new tear film is distributed on the cornea. After the blink, the tear film stabilizes. At this point in time, the tear film is a smooth as it will ever be. Essentially, this is the optimal state for the tear film. If no blinking occurs, the tear film normally begins to breakup over a time period ranging from about four (4) to about fifteen (15) seconds. During the breakup, the tear film becomes turbulent and begins to dry up in places. This may cause decreased visual acuity along with discomfort. Non-uniformity in the tear film may also lead to refraction errors caused by light scatter.

When a contact lens is placed on the eye, layers of tear film form both between the contact lens and the cornea and over the anterior contact lens surface. Proper distribution of the tear film is critical to achieving a comfortable lens fit and vision improvement, so lens materials must be designed to have a proper wetability. While some lens materials provide improvements such as increased oxygen permeability, their effects on tear film distribution are unknown. Presently, the lens must be tested in vivo during clinical trials where qualitative and only semi-quantitative tear film analysis methods, such as using fluorescein eye stain and slit lamp imaging, are used to evaluate tear film evolution and breakup.

With respect to the present invention, the tear film of interest is the tear film that forms between the posterior surface of the contact lens and the cornea. More particularly, it is the tear exchange, and not the tear film itself, that occurs between the posterior surface of the contact lens and the cornea that is the focus of the present invention. It is believed that poor tear exchange in the eye of a contact lens wearer contributes to an increase in adverse event rate. It is also believed that by increasing the thickness of the tear film, tear exchange rates may be increased. Prior art contact lenses have utilized simple features such as channels or grooves on the back curve surface of the contact lens to increase tear film thickness and thus increase tear exchange; however, it is believed that more complex features as set forth herein may be better due to an increased surface area and the patterns themselves.

Typically, for soft contact lenses, the posterior surface tear film thickness is less than five (5) microns. This thin tear film or layer makes it potentially difficult for tear exchange. Accordingly, a feature pattern based on fractal geometry may be formed on or in the non-optical portion or periphery of the back curve side of the contact lens. This feature pattern preferably allows for increased tear film thickness which in turn improves tear exchange via one or more mechanisms of action, including increased linear movement of the contact lens on the eye and transverse pumping as described in more detail below.

As set forth above, a thicker tear film preferably results in increased linear contact lens movement which in turn preferably improves tear exchange. The thicker tear film between the posterior surface of the contact lens and the cornea functions to lower the shear forces thereby allowing for easier linear movement of the contact lens. It is important to note that this is linear movement and not rotational movement and thus the present invention may be utilized in conjunction with any type of contact lens, including lenses requiring rotational orientation, for example, toric contact lenses. It is also important to note that the feature patterns may be optimized as to position on the periphery of the contact lens in order to control the movement of the contact lens in any direction. Essentially, the movement of the contact lens allows for fresh or new tears to move under the contact lens via the feature pattern such that there may be an increase in diffusion as well as the rate of diffusion of contaminants contained in the old tears and into the new or fresh tears. More importantly, there may be an optimization in the diffusion characteristics.

Also set forth above, a thicker tear film preferably results in transverse pumping which in turn improves tear exchange. In transverse pumping, as new tears move under the contact lens via the feature pattern, the contact lens tends to reposition itself in a manner such that it forces the new thicker tear film to redistribute thereby preferably forcing the old tear film out from underneath the contact lens. It is important to note that other mechanism of tear exchange may occur because of the use of the feature patterns of the present invention.

While the feature pattern based on fractal geometry is described herein, it is important to note that any suitable pattern may be utilized. Oversimplifying, a fractal may be defined as a rough or fragmented geometric shape that may be split into parts wherein each part is or is at least approximately a reduced size copy of the whole. This property is known as self-similarity. More specifically, a fractal has a number of features, including a fine structure at arbitrarily small scale, it is too irregular to be simply described in Euclidean geometry language, it is self-similar (at least approximately or stochastically), it has a Hausdorff dimension which is greater than its topological dimension and it has a simple and recursive definition. As approximate fractals may be found in nature, for example, in the formation of frost crystals, snowflakes, clouds and even fault lines and mountain ranges, it may be that a man made feature pattern based upon fractal geometry may provide preferable results for the movement of tears under a contact lens.

Figure 2:
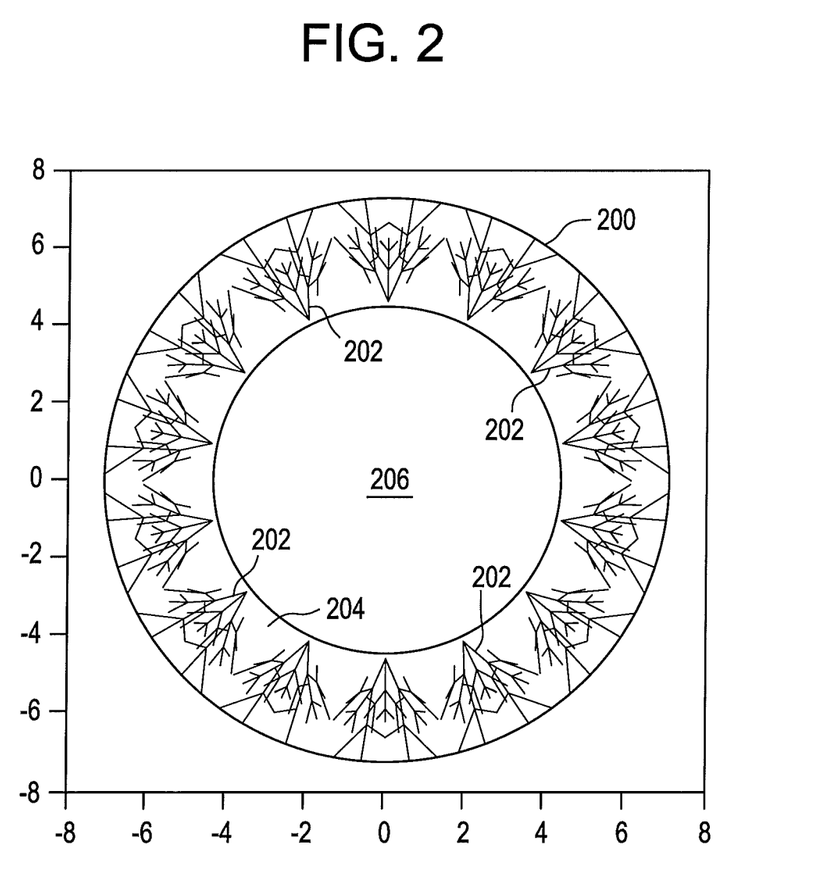
FIG. 2 is a diagrammatic representation of a first exemplary embodiment of a contact lens incorporating a feature pattern in its back curve surface in accordance with the present invention.

Referring now to FIG. 2, there is illustrated an exemplary contact lens 200 with a series or sets of feature patterns 202 formed in the peripheral region 204 on the back curve surface of the contact lens 200 such that the optic zone 206 is untouched. These feature patterns 202 may be generated utilizing an iterated function feature that is described in detail subsequently. In addition, the actual feature patterns 202 may be formed utilizing any suitable manufacturing techniques as is also described subsequently.

Figure 3:
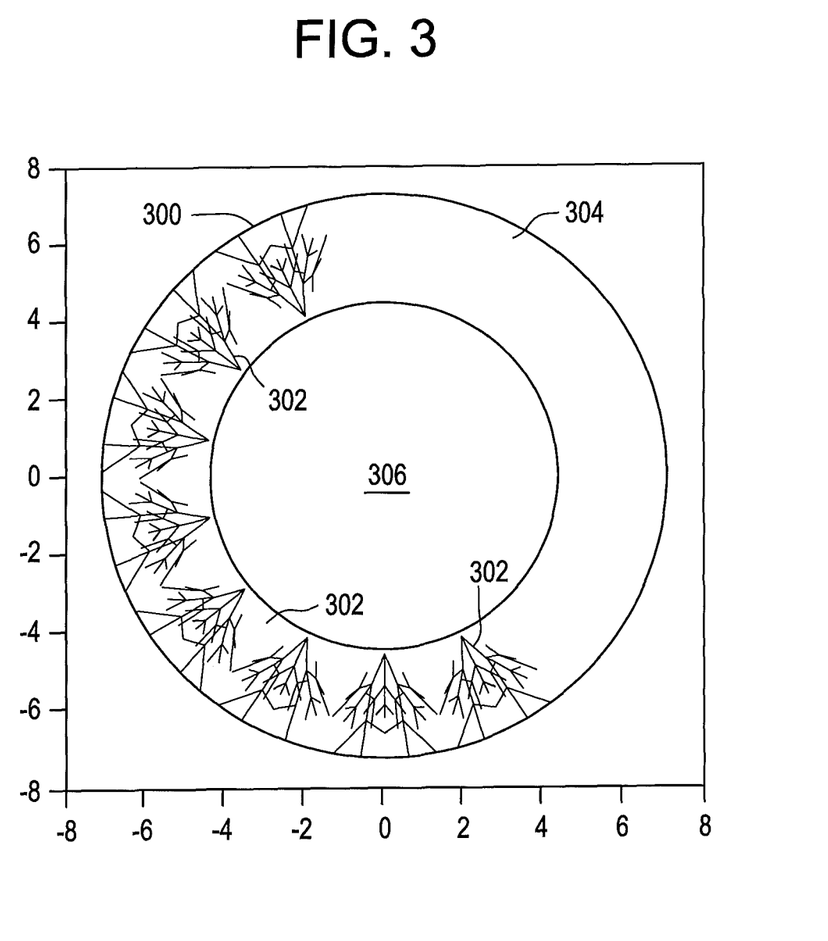
FIG. 3 is a diagrammatic representation of a second exemplary embodiment of a contact lens incorporating a feature pattern in its back curve surface in accordance with the present invention.

FIG. 3 illustrated another exemplary contact lens 300 with a series or sets of feature patterns 302 formed in only a portion of the peripheral region 304 on the back curve surface of the contact lens 300. As stated above, the feature patterns 302 may be optimized to control movement of the contact lens and this includes positioning of the patterns 302 on the contact lens 300 as well as changing the pattern itself. In other words, the feature patterns may be optimized in order to control both linear and rotational movement. Accordingly, for toric contact lenses, the feature patterns may be designed and incorporated into the back curve surface in such a manner as to provide or control rotational stability. Once again, the optical zone 306 is untouched.

There are five common techniques for generating fractals, including the utilization of a formula or recurrence relation at each point in space (escape-time fractals), the utilization of stochastic processes, for example, trajectories of the Brownian motion, Lévy flight, percolation clusters, self avoiding walks, fractal landscapes and the Brownian tree (random fractals), the iteration of a map or the solution of a system of initial-value differential equations that exhibit chaos (strange attractors), the utilization of string rewriting (L-systems), and iterated function systems. In accordance with the present invention, the fractal patterns may be generated utilizing an iterated function system where each function in the system acts on a set and is a contraction mapping. At the first iteration, the system of functions acts on a single set generating a new set for each function in the system. At the second iteration, the system of functions acts on the new sets generating a new set for each of the functions in the system and for each of the previous sets. The iterations may be repeated any number of times.

The exemplary pattern illustrated in FIGS. 2 and 3 may be developed utilizing the iterated function system. In this exemplary system, the seed set is a line segment and the iterated function system comprises three contraction mappings. In this exemplary embodiment, the metric, i.e. the distance between two sets, is defined to be the measure of the symmetric difference between any two sets, wherein an equivalence relation is defined for sets whose symmetric difference has zero measure. Additionally, the measure of a single set is defined as the length of the line segment.

The distance metric for sets A and B is defined by $$d(A,B) = \text{measure}(A \text{ union } B - A \text{ intersect } B) = \text{length } A + \text{length } B - \text{length of portion common between the two sets.} \quad (1)$$

The mappings employed for functions $f_i$ is given by $$f_i = R_i * e^{\sqrt{-1}\theta_i}, \quad (2)$$

where i=1, 2 and 3 and $R_i$<1. $R_i$ and $\theta_i$ define the length and angle parameters for $f_i$.

Accordingly, $f_i(A)$ is given by $$f_i(A) = A * R_i * e^{\sqrt{-1}\theta_i}, \quad (3)$$

where the starting values for this line segment are the end points for A and the end values for the line segment, in Cartesian coordinates, are x=real ($f_i(A)$) and y=imag ($f_i(A)$) respectively. These are clearly contraction mappings and it is known then that this iterated system will converge to a fractal. However, the feature patterns described herein are not taken to convergence.

In an alternate exemplary embodiment, the iterated function system may be augmented by a random element. In other words, the function, $f_i$, comprising the iterated function system may be altered in a random fashion. Specifically, the length, $R_i$, and the angle, $\theta_i$, portions of the function may be random rather than fixed. However, $R_i$ should still be less than 1 such that there is a contraction mapping.

A sample or exemplary code along with an example output for $R_1$=0.99 and $\theta_1$=1.10, $R_2$=0.70 and $\theta_2$=0.00, and $R_3$=0.99 and $\theta_3$=−1.10 is given in the Table below and graphically illustrated in FIGS. 2 and 3 respectively. Four iterations were executed to generate the patterns.

TABLE

```
clear all
close all
%This code generates graphs representing sets that in the limit converge to
%a fractal. An iterated function scheme is employed. The sets are line segments.
%Three contraction mappings make up this iterated function system. The contraction
mappings can be altered
%by adjusting the lengths or angles, or both. To do this, just change the
%values in the Function System block. Random changes to the functions can
%be incorporated; change "flag" to toggle this on or off. X and Y values of
%the sets can be written to an excel file. The start and end X and Y values
%are written in columns along with the set number.
%This version of the code maps the fractal from Cartesian coordinates to a pie shape and
then tiles this
%pie shape around the lens periphery. GH 1 April 2011.
%***************************
%Function System
%***************************
r=1;%seed
theta=pi/2;%seed
```

TABLE-continued

```
R(1)=.99;%F1
T(1)=1.1;%F1
R(2)=0.7;%F2
T(2)=0.0;%F2
R(3)=0.99;%F3
T(3)=-1.1;%F3
%****************************
%Initial Values
%****************************
ADJ_IN=zeros(15000,15000,'uint8');%Adjacency Matrix
u=0;%counter for adjacency matrix generation
count=1;count2=1;%count is number of sets at ith level;count2 is same, but for adjacency
matrix generation
N=4;%Number of iterations. Max N =8
L=0;%total number of sets
flag=0;%flag=1 --> random fractal%deterministic otherwise
flag0=0;%flag0=1-->display growing graphs
flag1=1;%flag1=1-->displays figures at each iteration step
flag2=0;%flag2=1-->write fractal to excell file
Xlim=[-4*r,4*r];Ylim=[-2*r,5*r];%axis limits typcial limits -6,6 and -4,6
Xall=[ ];%matrix used to find max X's
Yall=[ ];%matrix used to find max Y's
diameter=13.8;%lens diameter for scaling (not true lens diameter)
diameter_true=14.2;%true lens diameter
opticzone=9;%diameter of optic zone
annulus=(diameter-opticzone)/2;%radial length of periphial region
angle_degree=15;%angle over which fractal is transformed in degrees
angle = angle_degree*pi/180;%angle in proper units
%polar coordinate end points
phi_start=0;
phi_end=angle;
rad_start=opticzone/2;
rad_end=diameter/2;
angle_factor=5;%factor used to space patterns on circle
%****************************
%Establish coordinates of seed set
%****************************
Z{1}=r*exp(1i*theta);
X{1}(1)=0;
Y{1}(1)=0;
X{1}(2)=real(Z{1});
Y{1}(2)=imag(Z{1});
%****************************
%Create Adjacancy Matrix
%****************************
%adjacency matrix used to find connections between parent and child sets.
%GH 14 March 2011
for y=1:N
    L=L+3^y;%total number of sets
end
    for j=2:L+1
        u=u+1;%u just counts the number of iterated functions
        if(u<4)
            ADJ_IN(j,count2)=1;%triangular portion of adjacency matrix
        else
            count2=count2+1;
            u=1;
            ADJ_IN(j,count2)=1;%triangular portion of adjacency matrix
        end
    end
ADJ_IN=-1*ADJ_IN+ADJ_IN';%total adjacency matrix
%****************************
% Generate fractal
%****************************
if(flag1~=1)
    figure(1);
    plot(X{1},Y{1},'LineWidth',2);hold on%plot seed
    xlim(Xlim);ylim(Ylim);
end
k=1;%k is set index;
for i=2:N%iteration loop;N is number of iterations
    count=3^(i-2);%number of sets at ith level
    for jj=1:count%loop for ith level
        for j= 1:3%iterated function system loop; has three contraction mappings
            %R(1)=rand(1);T(1)=1.5*rand(1);R(2)=rand(1);T(2)=rand(1);R(3)=rand(1);T(3)=-T(1);
            k=k+1;%set index
            XT=ADJ_IN(:,k);%vector with connections to kth set
            inc_index=find(XT,1,'first');%find parent set kth set is connected to
            if(flag==1)%random or deterministic loop
                ra=(1-max(R))*(0.5-rand(1.0));%random length
```

TABLE-continued

```
                ta=0.25*(0.5-rand(1.0));%random angle
        else
                ra=0;
                ta=0;
        end
        R_r=R(j)+ra;
        T_r=T(j)+ta;
        Z{k}=Z{inc_index}*R_r*exp(1i*T_r);%iterate jth function on kth set
        X{k}(1)=X{inc_index}(2);%set starting value for X at end of parent set
        Y{k}(1)=Y{inc_index}(2);%set starting value for Y at end of parent set
        X{k}(2)=X{k}(1)+real(Z{k});%set end value for kth set
        Y{k}(2)=Y{k}(1)+imag(Z{k});% set end value for kth set
        if(flag1~=1)
                if(flag0==1)
                        figure(1);
                end
                plot(X{k},Y{k});hold on%plot kth set. Figure 1 displays final graph
                xlim(Xlim);ylim(Ylim);
        end
        end
    end
    if (flag1==1)
        figure(i);%figures for plotting each iteration step
        for ii=1:k%Loop to plot iteration steps. Figure N should be identical to Figure 1.
            xlim(Xlim);ylim(Ylim);
            line(X{ii},Y{ii});hold on;
        end
    end
end
if(flag2==1)%Loop to write results to Excel file
    FN1{1,1}='Xstart';FN2{1,1}='Xend';FN3{1,1}='Ystart';FN4{1,1}='Yend';FN5{1,1}='Line
Segment Number';
    xlswrite('Fractal_pattern.xlsx',FN1,'Sheet1','A1');
    xlswrite('Fractal_pattern.xlsx',FN2,'Sheet1','B1');
    xlswrite('Fractal_pattern.xlsx',FN3,'Sheet1','C1');
    xlswrite('Fractal_pattern.xlsx',FN4,'Sheet1','D1');
    xlswrite('Fractal_pattern.xlsx',FN5,'Sheet1','E1');
    for i=2:k%k is total number of sets at this point
        K=num2str(i);
        LN=['A' K];
        LN2=['C' K];
        LN3=['E' K];
        xlswrite('Fractal_pattern.xlsx',X{i},'Sheet1',LN)
        xlswrite('Fractal_pattern.xlsx',Y{i},'Sheet1',LN2)
        xlswrite('Fractal_pattern.xlsx',i,'Sheet1',LN3);
    end
end
for i=1:k%Loop to get X and Y points in a matrix, k total number of sets at this point.
        Xtemp=[X{i}(1) X{i}(2)];
        Ytemp=[Y{i}(1) Y{i}(2)];
        Xall=cat(1,Xall,Xtemp);
        Yall=cat(1,Yall,Ytemp);
end
Xmin=min(min(Xall));%find minimum of X's
Xmax=max(max(Xall));%find maximum of Y's
Ymin=min(min(Yall));%find minimum of X's
Ymax=max(max(Yall));%find maximum of Y's
for i=1:k
        for j=1:2
                t_x=(X{i}(j)-Xmin)/(Xmax-Xmin);
                t_y=(Y{i}(j)-Ymin)/(Ymax-Ymin);
                %phi=atan(Y{i}(j)/X{i}(j));
                A_x=sqrt(Y{i}(j)^2+X{i}(j)^2);
                A_y=sqrt(Y{i}(j)^2+X{i}(j)^2);
                X_new{i}(j)=A_x*cos(t_x);
                Y_new{i}(j)=A_y*sin(t_x);
        end
end
phi=atan((Y_new{1}(2)-Y_new{1}(1))/(X_new{1}(2)-X_new{1}(1)));
for i=1:k%rotation loop
        RM=[cos(pi/2-phi) -sin(pi/2-phi);sin(pi/2-phi) cos(pi/2-phi)];
        for j=1:2
                vrot_s=RM*[X_new{i}(j) Y_new{i}(j)]';
                X_r{i}(j)=vrot_s(1,1);
                Y_r{i}(j)=vrot_s(2,1);
        end
end
figure(101);
for i=1:k
    plot(X_new{i},Y_new{i});hold on
```

TABLE-continued

```
end
Xall=[ ];
Yall=[ ];
for i=2:k%Loop to get X and Y points in a matrix. k total number of sets at this point.
        Xtemp=[X_r{i}(1) X_r{i}(2)];
        Ytemp=[Y_r{i}(1) Y_r{i}(2)];
        Xall=cat(1,Xall,Xtemp);
        Yall=cat(1,Yall,Ytemp);
end
Xmin=min(min(Xall));%find minimum of X's
Xmax=max(max(Xall));%find maximum of Y's
Ymin=min(min(Yall));%find minimum of X's
Ymax=max(max(Yall));%find maximum of Y's
for i=2:k
    for j=1:2
        Y_final{i}(j)=annulus/(Ymax-Ymin)*Y_r{i}(j)+4.5-Ymin;
        X_final{i}(j)=X_r{i}(j);
    end
end
figure(100)
for i=2:k
    plot(X_r{i},Y_r{i});hold on
end
figure(102)
for i=2:k
    plot(X_final{i},Y_final{1});hold on
end
if(flag2==1)%Loop to write results to Excel file
    FN1{1,1}='Xstart';FN2{1,1}='Xend';FN3{1,1}='Ystart';FN4{1,1}='Yend';FN5{1,1}='Line
Segment Number';
    xlswrite('Fractal_pattern.xlsx',FN1,'Sheet1','A1');
    xlswrite('Fractal_pattern.xlsx',FN2,'Sheet1','B1');
    xlswrite('Fractal_pattern.xlsx',FN3,'Sheet1','C1');
    xlswrite('Fractal_pattern.xlsx',FN4,'Sheet1','D1');
    xlswrite('Fractal_pattern.xlsx',FN5,'Sheet1','E1');
    for i=2:k%k is total number of sets at this point
        K=num2str(i);
        LN=['A' K];
        LN2=['C' K];
        LN3=['E' K];
        xlswrite('Fractal_pattern.xlsx',X_final{i},'Sheet1',LN);
        xlswrite('Fractal_pattern.xlsx',Y_final{i},'Sheet1',LN2);
        xlswrite('Fractal_pattern.xlsx',i,'Sheet1',LN3);
    end
end
    %find angle through which pattern will be rotated
    Ix=find(Xall==Xmax);%find index of maximum value;this is the set containing
    if(Ix>k)%Need to do this since the find command uses linear indexing
        Ix=Ix-k;
        PB=[X_final{Ix}(2) Y_final{Ix}(2)];%boundary point
    else
        PB=[X_final{Ix}(1) Y_final{Ix}(1)];%boundary point
    end
    rot_angle=acos(PB(2)/sqrt((PB(2))^2+(PB(1))^2));%rot_angle is half the angle that
contains the pattern
    Npatterns=round (2*pi/(angle_factor*rot_angle));%number of patterns used that encircle
lens periphery
    phi_used=2*pi/Npatterns;%rotation angle
figure(200);%figure where lens pattern will be printed
for n_ang=1:Npatterns+1
    for i=2:k%rotation loop
        RM=[cos(n_ang*phi_used) -sin(n_ang*phi_used);sin(n_ang*phi_used)
cos(n_ang*phi_used)];%rotation matrix used for plotting lens pattern
        for j=1:2
            vrot_s=RM*[X_final{i}(j) Y_final{i}(j)]';%temporary vector rotated
            X_real_final{i}(j)=vrot_s(1,1);%X vector of tiled portion of pattern
            Y_real_final{i}(j)=vrot_s(2,1);%Y vector of tiled portion of pattern
        end
        plot(X_real_final{i},Y_real_final{i});hold on%plot tiled pattern
        axis square;%hold plot square
    end
end
circle_1=rsmak('circle',opticzone/2);%optic zone boundary
circle_2=rsmak('circle',diameter_true/2);%lens edge
fnplt(circle_1);%plot optic zone
fnplt(circle_2);%plot lens edge
```

The feature pattern generated may be repeatedly applied to all portions of the contact lens outside the optic zone, or may be placed in only a few or selected locations so as to help stabilize the contact lens. In other words, the feature pattern may be placed or positioned in discrete locations around the periphery of the contact lens and/or continuously around the periphery of the contact lens. The positions are preferably determined utilizing a combination of simulations and experimentation. In other words, contact lens movement may be manipulated by creating zones of thicker or thinner tear films and this may be exploited to help stabilize the contact lens without the need for rotational stabilization zones. For example, this may be accomplished by placing the pattern in certain locations to counter the torque on the contact lens created during blinking. This may be particularly advantageous for toric contact lenses.

Once the feature pattern is generated it must be transferred to the contact lens. Any suitable method for forming the feature pattern or cutting the feature pattern into the back curve surface of the contact lens may be utilized. It is important to note that the feature pattern is formed in or cut into the back curve surface of the contact lens rather than simply printed thereon. For example, the feature pattern may be transferred to a tool utilized to create a mold with the feature pattern and then cast mold the contact lens in the same manner as contact lenses are currently manufactured. It is important to note that the contact lenses may be manufactured utilizing any suitable technique know in the industry and that the feature pattern may be incorporated into the back curve surface thereof also utilizing any suitable process as is known in the art as processes for forming contact lenses may vary from manufacturer to manufacturer as well as from lens to lens.

The feature pattern may be incorporated into any number of contact lenses. Contact lenses may be formed from any number of suitable biocompatible materials providing a range of oxygen permeability, wetability and convenience. There are a number of contact lens designs, including daily wear soft contact lenses, colored soft contact lenses, rigid gas permeable hard contact lenses, bifocal contact lenses, toric contact lenses and corneal reshaping treatment contact lenses.

In an alternate exemplary embodiment, the feature patterns serve to enhance the appearance of the eye and/or to both provide enhanced tear exchange and enhanced appearance. In this exemplary embodiment, the feature patterns may be highlighted and/or tined to bring out the design thereof.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. An ophthalmic device comprising:
   a contact lens having a back curve surface, a front curve surface, an optic zone and a peripheral zone; and
   at least one feature pattern cut into the back curve surface in at least one portion of the peripheral zone of the contact lens and configured for enhanced tear exchange posterior to the contact lens and at least one of linear or rotational movement of the ophthalmic device, the at least one feature pattern being generated utilizing a randomly augmented iterated function system wherein a seed set comprises a line segment and the iterated function comprises three contraction mappings.

2. The ophthalmic device according to claim 1, wherein the contact lens comprises a soft contact lens.

3. The ophthalmic device according to claim 1, wherein the contact lens comprises a rigid gas permeable hard contact lens.

4. The ophthalmic device according to claim 1, wherein the contact lens comprises a toric contact lens.

5. The ophthalmic device according to claim 1, wherein the feature pattern may be incorporated into one or more discrete locations in the peripheral zone of the back curve surface of the contact lens.

6. The ophthalmic device according to claim 1, wherein the feature pattern may be incorporated continuously into the peripheral zone of the back curve surface of the contact lens.

* * * * *